(12) United States Patent
Rhee et al.

(10) Patent No.: US 12,298,323 B2
(45) Date of Patent: May 13, 2025

(54) SYSTEM FOR AUTOMATING PROCESSING OF SAMPLE FOR ANALYSIS AND METHOD OF PROCESSING SAMPLE USING THE SAME

(71) Applicant: SK hynix Inc., Icheon-si (KR)

(72) Inventors: Chan Hyuk Rhee, Icheon-si (KR); Jong Hee Yoo, Icheon-si (KR); Kee Jeung Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 264 days.

(21) Appl. No.: 18/054,278

(22) Filed: Nov. 10, 2022

(65) Prior Publication Data

US 2023/0152341 A1 May 18, 2023

(30) Foreign Application Priority Data

Nov. 16, 2021 (KR) .................. 10-2021-0157807
Aug. 22, 2022 (KR) .................. 10-2022-0105017

(51) Int. Cl.
*G01N 35/04* (2006.01)
*G01N 1/04* (2006.01)
*G01N 35/00* (2006.01)

(52) U.S. Cl.
CPC ............... *G01N 35/04* (2013.01); *G01N 1/04* (2013.01); *G01N 35/00732* (2013.01)

(58) Field of Classification Search
CPC .... G01N 35/04; G01N 1/04; G01N 35/00732; G01N 2035/0465; G01N 1/286; G01N 1/28; H01L 21/304; H01L 21/67161; H01L 21/6719; H01L 21/67196; H01L 21/67207; H01L 21/67282; H01L 23/544
See application file for complete search history.

(56) References Cited

U.S. PATENT DOCUMENTS

| | | | |
|---|---|---|---|
| 7,479,399 B1 | 1/2009 | Johnson et al. | |
| 7,504,623 B2 | 3/2009 | Fischione et al. | |
| 2023/0067060 A1* | 3/2023 | Oh | H01L 21/67294 |
| 2023/0107043 A1* | 4/2023 | Oh | H01L 21/67766 |
| | | | 700/228 |

FOREIGN PATENT DOCUMENTS

| | | |
|---|---|---|
| JP | 3891390 B2 | 12/2006 |
| JP | 2013007714 A | 1/2013 |
| KR | 100554511 B1 | 3/2006 |
| KR | 1020060089109 A | 8/2006 |
| KR | 100708867 B1 | 4/2007 |
| KR | 1020100030000 A | 3/2010 |
| KR | 100975851 B1 | 8/2010 |
| KR | 102257901 B1 | 5/2021 |

* cited by examiner

*Primary Examiner* — Xin Y Zhong

(57) ABSTRACT

A system for automating the processing of a sample for analysis includes a sample processing unit configured to manufacture a plurality of unit wafers by cutting an analysis target wafer and to manufacture a sample for analysis by applying at least one process to one of the plurality of unit wafers, a sample storage unit including a loading area having a plurality of reception holders, on which a unit wafer and the sample for analysis have been loaded, that are carried in and out, and a sample conveying unit configured to convey the analysis target wafer, the unit wafer, and the sample for analysis respectively between the sample processing unit and the sample storage unit.

20 Claims, 7 Drawing Sheets

SYSTEM FOR AUTOMATING PROCESSING OF SAMPLE FOR ANALYSIS AND METHOD OF PROCESSING SAMPLE USING THE SAME

CROSS-REFERENCE TO RELATED APPLICATION

The present application claims priority under 35 U.S.C. § 119(a) to Korean application number 10-2021-0157807, filed on Nov. 16, 2021, and Korean application number 10-2022-0105017, filed on Aug. 22, 2022, in the Korean Intellectual Property Office, which are incorporated herein by reference.

BACKGROUND

Various embodiments relate to a system for automating the processing of a sample for analysis and to a system capable of automating all processes for the processing of the sample for analysis. Embodiments relate to automating processes for the warehousing of a wafer, processing for the manufacturing of a sample for analysis, and generating a distribution of a sample for each analysis.

As recent technology for integrating semiconductor devices continues to improve, a larger number of devices are integrated on one wafer. As a result, the presence of a defect on the wafer has a great influence on the yield. Accordingly, the importance of analytical processes that check whether or not a defect is present on a wafer is increasing. In particular, as the degree of integration of devices is increased, the need to analyze even finer defects is increased.

Semiconductor device can be analyzed by using analysis equipment, such as a scanning electron microscope (SEM), a transmission electron microscope (TEM), a focused ion beam (FIB), or a secondary ion mass spectrometry (SIMS). The analysis of the semiconductor device is performed by using a method of separately manufacturing a sample for analysis by processing a wafer through a pre-processing method and then analyzing the manufactured sample.

In general, a sample for analysis is manufactured by processing a wafer by using a different method depending on the analysis method applied to the sample. The sample for analysis is manufactured by using processing equipment for each unit module, such as an ion milling apparatus, a cutting apparatus, or a dimpling apparatus, and by performing a plurality of processing processes. However, in such processing equipment, equipment and samples among manufacturers have not been standardized because the manufacturers of the processing equipment are different from each other. For this reason, the automation of processing equipment is difficult because of the differences in information and materials between pieces of equipment, because manpower consumption, analysis cost, and analysis time are greatly increased with the need for worker intervention, and because the construction of infrastructure is difficult.

SUMMARY

In an embodiment, a system for automating the processing of a sample for analysis may include a sample processing unit configured to manufacture a plurality of unit wafers by cutting an analysis target wafer and to manufacture a sample for analysis by applying at least one process to one of the plurality of unit wafers, a sample storage unit including a loading area having a plurality of reception holders, on which a unit wafer and the sample for analysis have been loaded, that are carried in and out, and a sample conveying unit configured to convey the analysis target wafer, the unit wafer, and the sample for analysis respectively between the sample processing unit and the sample storage unit.

According to an embodiment, a reception holder may include a holder body configured to support the unit wafer and the sample for analysis, a first reception stage formed on one side of and at a top of the holder body and to which the unit wafer is removably coupled, and a second reception stage formed on another side of and at the top of the holder body and to which a grid with the unit wafer is removably coupled.

The first reception stage may have a structure in which a fixing groove inserted on the one side of the holder body and on an upper side of the holder body, a support plate installed within the fixing groove and configured to have the unit wafer seated at a top of the support plate and a shaft formed at a bottom of the support plate, an elastic member installed along an outer circumference surface of the shaft, an elastic clip equipped with a trapping protrusion that protrudes from an inner wall of the fixing groove, and a clamp unit inserted and coupled to the fixing groove, and a movable space in which the elastic clip moves, wherein the unit wafer is removably fixed to an upper side of the clamp unit along with a cover frame, and wherein an exposure hole exposes the trapping protrusion on one side of the clamp unit and at a top of the clamp unit when the unit wafer is pressed.

According to an embodiment, the sample storage unit may have a structure including a first loading area, in which the reception holder is stored, in which the unit wafer is coupled to at least any one of a first reception stage and second reception stage of the reception holder and a second loading area from which the sample for analysis is carried in and out.

According to an embodiment, the sample conveying unit may have a structure including a first conveying module configured to convey the analysis target wafer to the sample processing unit, a second conveying module configured to convey and attach the unit wafer to the reception holder, and a third conveying module configured to convey the reception holder to the sample processing unit.

According to an embodiment, the system may further include a sample classification unit including a tag module installed on one side of the reception holder to store identification codes of the unit wafer and the reception holder, a reading module configured to recognize the identification codes that have been stored in the tag module, and a code generation module configured to generate an identification code and to transmit the generated identification code to the tag module.

According to an embodiment, the system may further include a controller including a communication module configured to transmit and receive identification codes that are recognized by the reading module, a terminal module installed in the sample processing unit and configured to receive individual processing information and to control performance of a processing process, a management module configured to store identification codes of the unit wafer and of the sample for analysis, which has been received in the sample storage unit, and configured to manage carrying-in and carrying-out of the unit wafer and the sample for analysis that have been received in the sample storage unit, and a processing information generation module configured to generate individual processing information of the unit wafer based on the identification code and configured to transmit the generated individual processing information to the terminal module, the management module, and the sample conveying unit. The controller may be configured to control operations of the sample processing unit, the sample storage unit, and the sample conveying unit based on the identification code.

The processing information generation module may be configured to generate the processing information by receiving analysis scheme information of the unit wafer when a management server generates the analysis scheme information based on the identification code and transmits the generated analysis scheme information.

According to an embodiment, the system may further include a manager terminal unit configured to receive driving state and task information of the sample processing unit, the sample storage unit, and the sample conveying unit.

In an embodiment, a wafer analysis automation system may include a sample processing unit configured to manufacture a plurality of unit wafers by cutting an analysis target wafer and configured to manufacture a sample for analysis by subjecting a unit wafer to at least one processing process, a sample storage unit, including a loading area with reception holders on which the unit wafer and the sample for analysis have been loaded, to and from which the reception holders are carried, a sample analysis unit configured to analyze the sample for analysis from the sample storage unit, and a sample conveying unit configured to convey, respectively, the analysis target wafer, the unit wafer, and the sample for analysis between the sample processing unit and the sample storage unit.

In an embodiment, a method of processing a sample for analysis may include a first processing step of conveying an analysis target wafer to a sample processing unit and forming a plurality of unit wafers by performing cutting processing on the analysis target wafer, a first storage step of separating the unit wafer from the analysis target wafer and storing the unit wafer loaded on a reception holder that has been received in a sample storage unit, a second processing step of carrying out, from the sample storage unit, the reception holder loaded with the unit wafer, conveying the reception holder to the sample processing unit, and manufacturing a sample for analysis by processing the unit wafer using individual processing information based on an identification code, and a second storage step of conveying the sample for analysis loaded on a reception holder to be received by the sample storage unit.

DETAILED DESCRIPTION

Terms used in this specification may be defined as follows.

First, a wafer means a wafer-raw material for analysis. The wafer-raw material may be manufactured according to various standards, and may have various diameters, such as 150 mm, 200 mm, 300 mm, and 450 mm. Furthermore, the wafer may include various types of wafers, such as a semiconductor wafer, a wafer for a light-emitting diode, and a wafer for a solar cell. The wafer may be a bare wafer.

A unit wafer S may mean a piece of a wafer prior to processing, which has been manufactured by cutting the wafer in order to manufacture a sample AS for analysis. In other words, the unit wafer S may mean a wafer piece.

The sample AS for analysis may mean a unit wafer S on which one or more of processing processes, such as cutting, dimpling, ion milling, polishing, coating, grinding, cleaning, and punching have been performed for wafer analysis.

"Processing" may mean all pre-processing processes which are performed within an automation system according to an embodiment until a wafer becomes a sample AS for analysis.

"Analysis" may mean sample analysis that is performed for wafer analysis in a sample analysis unit to be described later or in analysis equipment of an actual analysis room.

Furthermore, apparatuses that are described in this specification may be entirely hardware or may have a partial hardware aspect and a partial software aspect. For example, a system for automating the processing of a sample for analysis, each terminal, apparatus, or server that communicates with the system, and each module or unit that is included in each of the terminal, apparatus, or server may commonly refer to an apparatus for exchanging data having a specific format and contents in an electronic communication manner and software that is related to the apparatus. In this specification, a term, such as a "unit", a "module", a "server", a "system", a "platform", an "apparatus", or a "terminal", may be intended to denote a combination of hardware and software that is driven by the corresponding hardware. For example, in this case, the hardware may be a data processing device that includes a CPU or another processor. Furthermore, the software that is driven by the hardware may denote a process being executed, an object, an executable file, a thread of execution, or a program.

Hereinafter, a system 10 for automating the processing of a sample for analysis according to an embodiment is described in detail.

Figure 1:
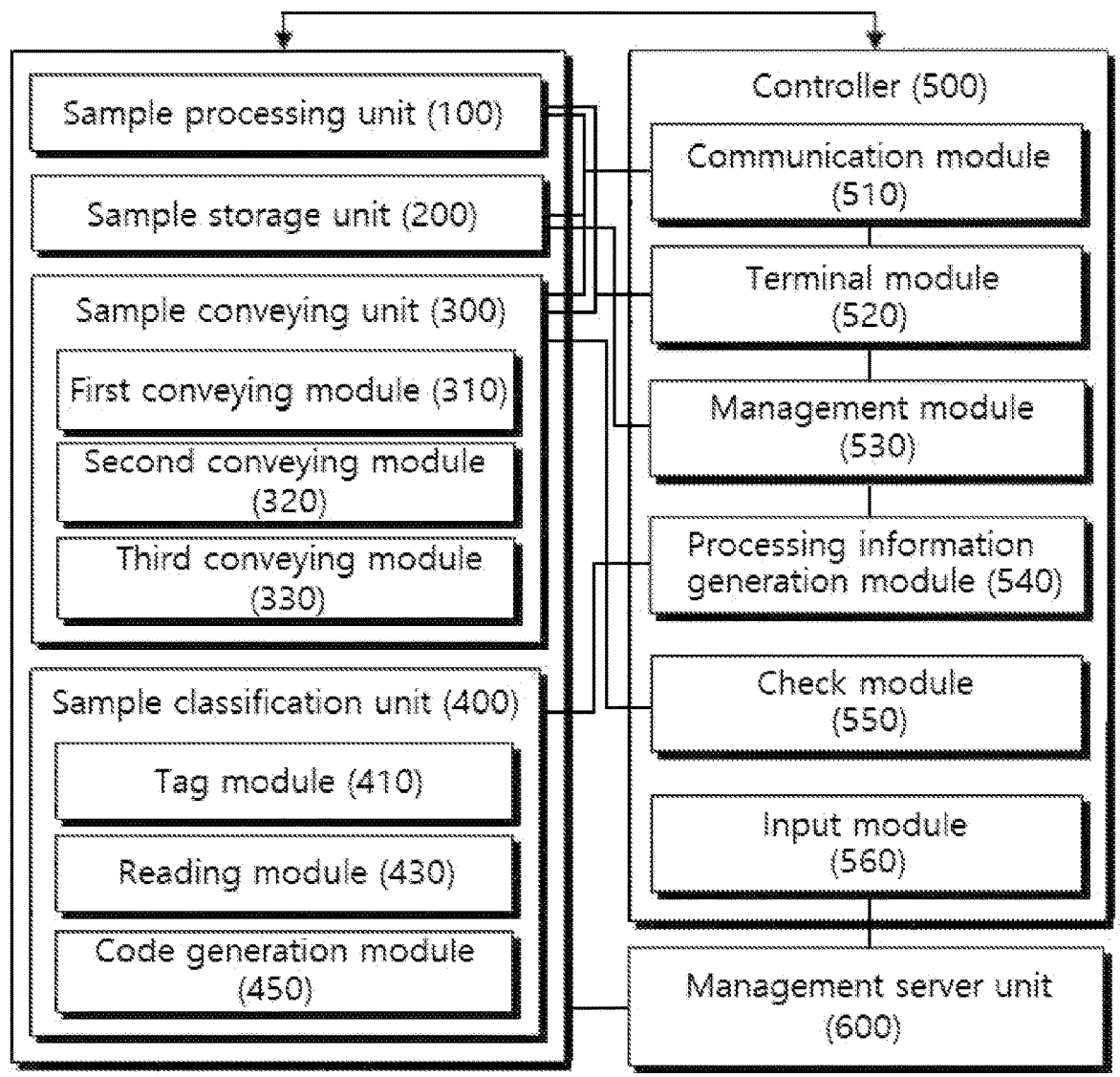
FIG. 1 is a construction diagram illustrating a system for automating the processing of a sample for analysis according to an embodiment of the disclosure.
Figure 2:
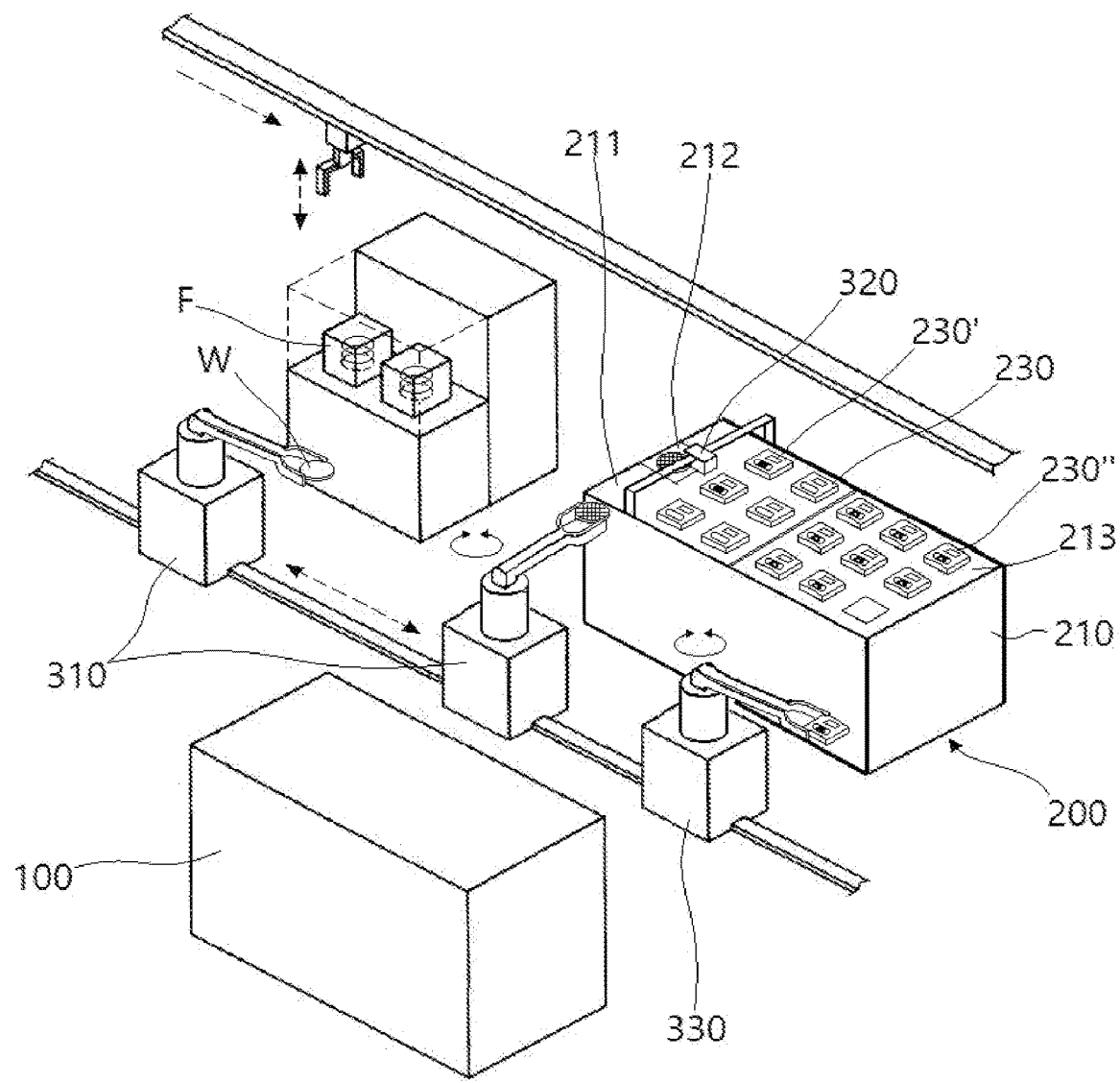
FIG. 2 is a concept view illustrating a system for automating the processing of a sample for analysis according to an embodiment of the disclosure.
Figure 3:
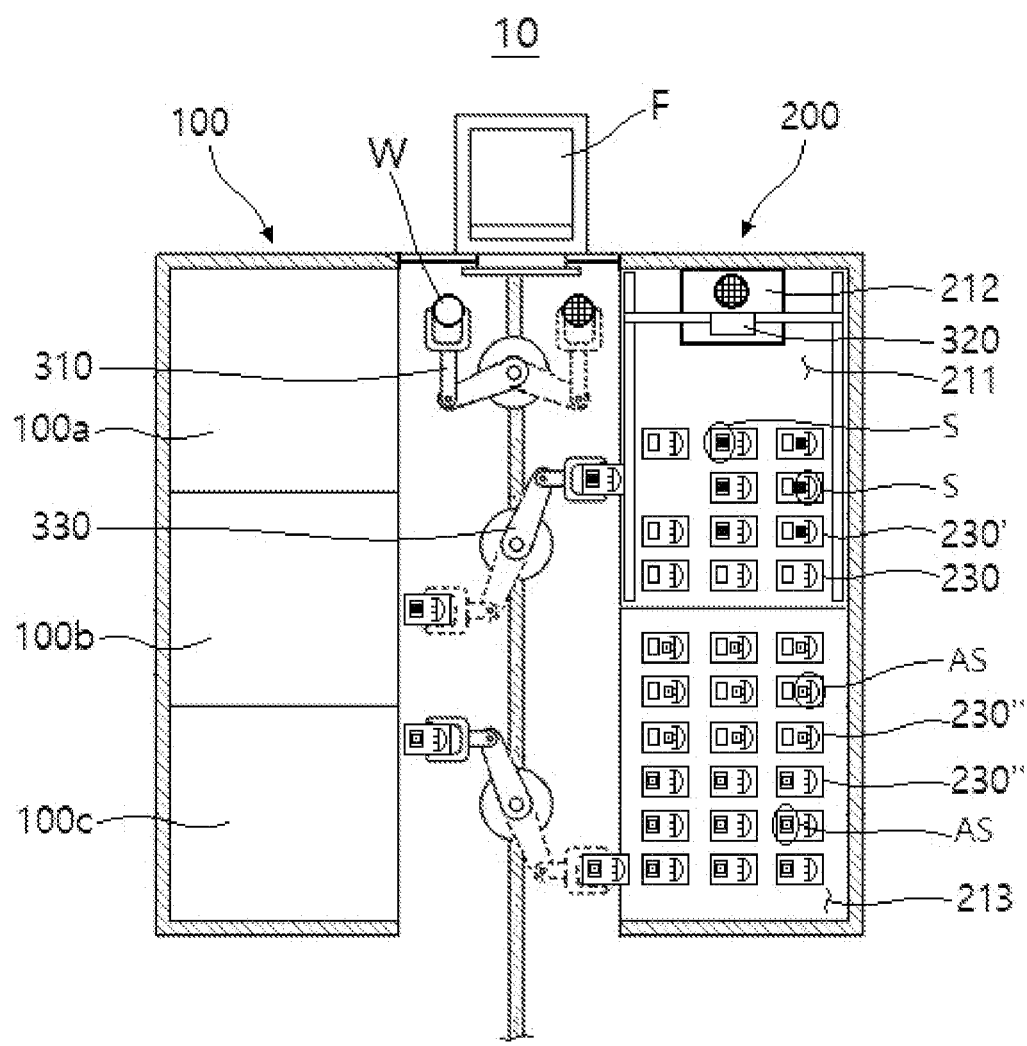
FIG. 3 is a processing state diagram of a system for automating the processing of a sample for analysis according to an embodiment of the disclosure.

FIG. 1 is a construction diagram illustrating a system for automating the processing of a sample for analysis according to an embodiment of the disclosure. FIG. 2 is a concept view illustrating a system for automating the processing of a sample for analysis according to an embodiment of the disclosure. FIG. 3 is a processing state diagram of a system for automating the processing of a sample for analysis according to an embodiment of the disclosure.

Referring to FIGS. 1 to 3, a system 10 for automating the processing of a sample for analysis may have a structure including a sample processing unit 100, a sample storage unit 200, and a sample conveying unit 300.

The sample processing unit 100 may play a role in manufacturing a plurality of unit wafers S by cutting an analysis target wafer W and in manufacturing a sample AS for analysis by processing the unit wafers S through at least one processing process.

The sample processing unit 100 may manufacture, for analysis, a sample AS, which may have various forms. For example, the sample AS for analysis may be a sample for scanning electron microscope (SEM) analysis or a sample for transmission electron microscope (TEM) analysis. The sample for SEM analysis and the sample for TEM analysis may be manufactured by using different processing methods to manufacture the unit wafer S. That is, the sample processing unit 100 may generate the unit wafer S, and may manufacture various types and forms of sample AS for analysis by processing the generated unit wafer S through at least one processing method.

To this end, the sample processing unit 100 may manufacture the sample AS for analysis by processing a wafer using at least any one of methods such as cutting, dimpling, ion milling, polishing, coating, grinding, and cleaning, as non-limiting examples. To this end, the sample processing unit 100 may include at least one processing apparatus, such as a cutting apparatus, a dimpling apparatus, an ion milling apparatus, a polishing apparatus, a coating apparatus, a grinding apparatus, a cleaning apparatus, or a punching apparatus, as non-limiting examples. For instance, the sample processing unit 100 may manufacture a unit wafer S, and may form a dimple area in the unit wafer S by performing dimpling processing on the unit wafer S, or may perform an ion milling process of polishing the unit wafer S to a fine thickness. Furthermore, the sample processing unit 100 may perform polishing processing to smooth a surface of the unit wafer S, may puncture the unit wafer S through punching, or may perform a cleaning process of removing a residue on a surface of the unit wafer S.

The sample processing unit 100 may form a plurality of unit wafers S by cutting a wafer, and may manufacture a sample AS for analysis by processing the unit wafer S. That is, as illustrated in FIG. 3, an analysis target wafer W may be conveyed to a first processing apparatus 100a. A plurality of unit wafers S may be manufactured by performing cutting processing on the analysis target wafer W. The manufactured analysis target wafer W may be stored in the sample storage unit 200.

First, the sample processing unit 100 may generate the plurality of unit wafers S by cutting the analysis target wafer W. Thereafter, the individual unit wafers S may be separated and loaded on a reception holder 230 by the sample conveying unit. The sample AS for analysis may be manufactured by processing a unit wafer S that has been loaded on the reception holder 230 as described above using any one or more methods of processing.

Furthermore, the sample processing unit 100 may manufacture the sample AS by processing the unit wafer S under the control of individual processing information of the unit wafer S that is generated by analysis scheme information based on an identification code. For example, when analysis scheme information calls for large area SEM analysis, the sample processing unit 100 may generate a unit wafer S and perform a dimpling process on the unit wafer S, and then further process the unit wafer S with two methods for ion milling processing to manufacture a sample for SEM analysis.

The unit wafer S may be conveyed by the sample conveying unit 300 in order to perform a processing process through one or more different methods. That is, as illustrated in FIG. 3, a sample that has been processed by a second processing apparatus 100b may be conveyed and processed in a third processing apparatus 100c.

The manufactured sample AS for analysis may be carried out from a processing apparatus that is installed in the sample processing unit 100, and may be received in the sample storage unit 200. The sample AS for analysis that has been received in the sample storage unit 200 may be subsequently removed for performance of additional processing on the sample AS.

The sample storage unit 200 may have a structure that includes a loading area with reception holders 230. The unit wafer S and the sample AS may be loaded onto the reception holders 230, and therefore may be respectively moved in and out of the sample storage unit 200. Accordingly, the sample storage unit 200 may store and keep a plurality of unit wafers S and samples AS for analysis.

The sample storage unit 200 may have a structure including a storage chamber 210 and the reception holder 230.

The loading area may be formed in the storage chamber 210. A plurality of unit wafers S and samples AS for analysis may be stored and kept in the storage chamber 210. The storage chamber 210 may receive the unit wafer S, may move the unit wafer S out of the storage chamber 210, may manufacture the sample AS for analysis by processing the unit wafer S, and may receive manufactured samples AS for analysis. The storage chamber 210 may store unit wafers S and samples AS for analysis that are waiting for processing.

The storage chamber 210 may have a structure in which a plurality of loading areas has been formed. For example, the storage chamber 210 may have a structure including a first loading area 211 and a second loading area 213.

A reception holder 230 on which a unit wafer S has not been loaded is stored in the first loading area 211. The first loading area 211 may generate a space for loading the unit wafer S onto the reception holder 230, and may include space for a reception holder 230' loaded with a unit wafer S.

Furthermore, the first loading area 211 may include a wafer station 212 on which the analysis target wafer W is loaded after being subjected to cutting processing. The wafer station 212 may be formed on one side of the first loading area 211.

Unloaded reception holders 230 may be arranged in the first loading area 211.

Furthermore, the first loading area 211 may have a structure in which the wafer station 212 is loaded with an analysis target wafer W that has been subjected to cutting processing in a cutting apparatus of the sample processing unit 100. Accordingly, the first loading area 211 may provide a space for separating the unit wafer S from the analysis target wafer W, for conveying and loading the separated unit wafer S onto an unloaded reception holder 230, and for forming the reception holder 230' on which the unit wafer S has been loaded. Furthermore, the first loading area 211 may receive and store the reception holder 230' on which the unit wafer S has been loaded.

The second loading area 213 may be formed on one side of the first loading area 211, and may include a space to and from which a loaded reception holder can be moved in and out of the storage chamber 210.

For example, a unit wafer S may be loaded onto a reception holder 230' that is removed from the first loading area 211 of the storage chamber 210 and delivered to the sample processing unit 100. The sample AS for analysis may be manufactured in the sample processing unit 100. A reception holder 230" on which the sample AS for analysis has been loaded is conveyed from the sample processing unit 100 and received in the second loading area 213. The received reception holder 230" on which the sample AS for analysis has been loaded may be carried out from the second loading area 213 in order to perform an analysis process on the sample AS.

Furthermore, the second loading area 213 may include a plurality of divided reception spaces. Accordingly, the samples AS for analysis may be classified according to categories of analysis schemes and received in the plurality of divided reception spaces. The plurality of samples AS for analysis may be received and kept in the second loading area 213 and removed from the second loading area 213 for the actual analysis.

The storage chamber 210 may have a structure in which at least one opening has been formed on one surface of the storage chamber 210, and may have a structure in which a cover for exposing and closing the opening has been installed. Accordingly, the storage chamber 210 may form a structure in which the unit wafer S and the sample AS for analysis are carried in and out through an opening of the storage chamber.

The sample storage unit 200 having a structure described above may carry the unit wafer S that is received in the storage chamber 210 out to the sample processing unit 100 in order to process the unit wafer S. Furthermore, the sample storage unit 200 may carry the sample AS for analysis. The sample AS has been manufactured by using any one or more of the processing methods using a specific processing apparatus that is included in the sample processing unit 100, so the sample processing unit 100 can keep the sample AS for analysis and to perform additional processing. The sample AS for analysis that has been additionally processed may be returned by the sample conveying unit 300 and warehoused again in the sample storage unit 200.

The unit wafer S and the sample AS for analysis may be received and conveyed by the sample conveying unit using the reception holder 230. To this end, the reception holder 230 may include a space on which the unit wafer S or the sample AS for analysis is mounted. Furthermore, the reception holder 230 may be passed between each of the processing apparatus of the sample processing unit 100 and the sample conveying unit 300. The unit wafer S may be stored in the storage chamber 210 loaded onto the reception holder 230, and the unit wafer S may be carried out from the storage chamber 210 for processing to generate samples AS for analysis. The reception holder 230 may have a structure on which the sample AS for analysis is loaded after the unit wafer S is processed in the sample processing unit 100.

Figure 4:
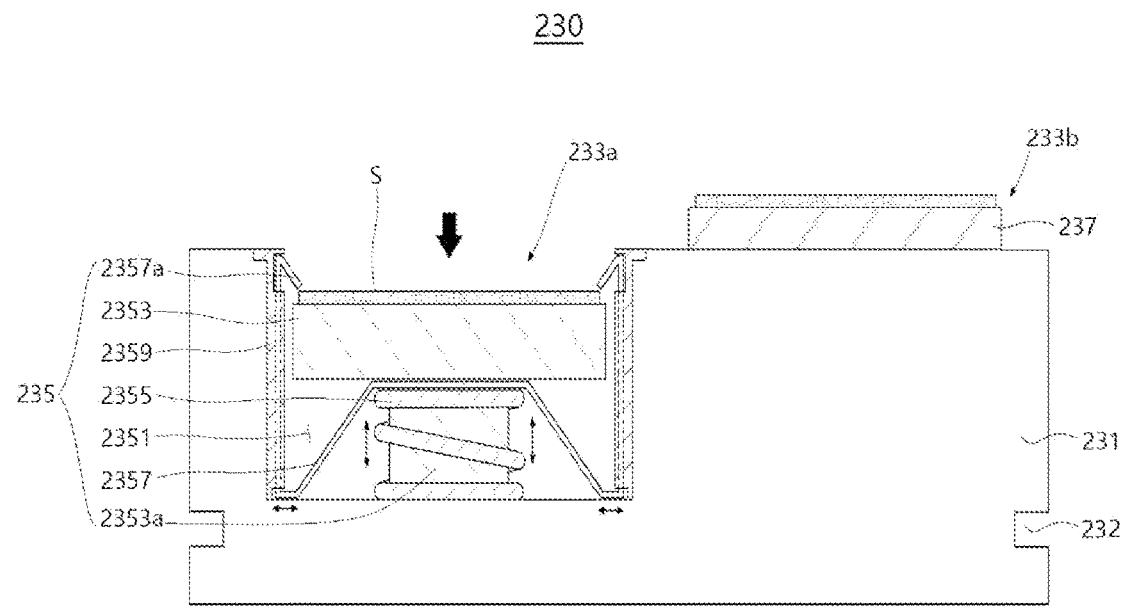
FIG. 4 is a cross-sectional view illustrating a reception holder of the system for automating the processing of a sample for analysis according to an embodiment of the disclosure.

FIG. 4 is a cross-sectional view illustrating a reception holder of the system for automating the processing of a sample for analysis according to an embodiment of the disclosure.

Referring to FIG. 4, a reception holder 230 may have a holder body 231 and a plurality of reception stages 233a and 233b.

The holder body 231 may have a given shape, and may be received in each of the storage chamber 210 and the sample processing unit 100. The holder body 231 may have a coupling groove 232 formed on one side of the holder body 231. The coupling groove 232 can be used to couple the holder body 231 to the processing apparatus of the sample processing unit 100. For example, the coupling groove 232 may be used to clamp the holder body 231 to the processing apparatus of the sample processing unit 100. Many processing apparatuses have matching structures that permit attaching and detaching of the holder body 231 to processing apparatuses, however, if manufacturers of processing apparatuses are different from each other, then the reception holder 230 in each processing apparatus might not be interchangeable in different processing apparatuses made by different manufacturers. Accordingly, in embodiments of the disclosure, the reception holder 230 may be fixed by installing the same fixing structure in each processing apparatus. Accordingly, the holder body 231 may be installed in many types of processing apparatuses made by different manufacturers.

The reception holder 230 may have a structure in which the plurality of reception stages 233a and 233b has been formed so that the unit wafer S is processed by using a different method depending on an analysis method.

For example, the reception holder 230 may have a structure including a first reception stage 233a and a second reception stage 233b.

The first reception stage 233a may be formed on one side of the holder body 231 and at the top of the holder body 231, and may include a reception space on which the unit wafer S is received. The first reception stage 233a may be installed to have a structure to and from which the unit wafer S is attachable and detachable, and may have a structure including a clamp unit 235.

Specifically, the clamp unit 235 may have a structure including a fixing groove 2351, a support plate 2353, an elastic member 2355, an elastic clip 2357, and a cover frame 2359.

The fixing groove 2351 may be inserted at the top of the holder body 231 and on one side of the holder body 231. The fixing groove 2351 may be open at the top, and the support plate 2353, the elastic member 2355, and the elastic clip 2357 may be arranged in the fixing groove 2351.

The support plate 2353 may be disposed on a shaft 2353a that extends upward from the bottom of the fixing groove 2351. A unit wafer S may be seated at the top of the support plate 2353.

The elastic member 2355 may be installed along the outer circumference surface of the shaft 2353a that extends from the bottom of the support plate 2353. The elastic member 2355 may be implemented as an elastic spring so that the elastic member 2355 is contracted when the top of the support plate 2353 is pressurized and descends and is restored when pressurization at the top of the support plate 2353 is released and the support plate 2353 ascends.

The elastic clip 2357 may have a trapping protrusion 2357a that is formed to protrude from an inner wall of the fixing groove 2351. The trapping protrusion 2357a elastically deforms at both sides of the elastic clip 2357 when the top of the support plate 2353 is pressurized and the trapping protrusion 2357a is restored when pressurization for the top of the support plate 2353 is released. The trapping protrusion 2357a fixes the unit wafer S to the fixing groove 2351 by clamping both side surfaces of the unit wafer S. When the top of the unit wafer S is re-pressurized, the trapping protrusion 2357a is expanded at both sides of the elastic clip 2357, the support plate 2353 ascends, and the unit wafer S is taken out of the fixing groove 2351.

The cover frame 2359 may be inserted and coupled to an inner wall of the fixing groove 2351, may form a space in which an elastic clip moves, and may have a structure in which an exposure hole has been formed so that the trapping protrusion 2357*a* is exposed on one side of and at the top of cover frame 2359.

The unit wafer S can be removably attached to the first reception stage 233*a* by using the clamp unit 235.

The second reception stage 233*b* may be formed on the other side of, and at the top of, the holder body 231, and may include a space or recess into which the unit wafer S is received. The second reception stage 233*b* may include a space to which a grid 237 is removably coupled. The unit wafer S may be installed at the top of the grid 237. The grid 237 may be implemented by using a common grid structure having various forms, on which the unit wafer is installed. A representative example of the grid 237 may be a half-moon grid. That is, in the state in which the grid 237 has been fixed and formed in the second reception stage 233*b*, the unit wafer S may be installed at the top of the grid 237. In this case, the unit wafer that is installed at the top of the grid 237 may be processed to have a size of 0.1 to 20 μm or may be manufactured by additionally processing the unit wafer. In particular, the unit wafer that is installed at the top of the grid 237 may be processed to have a size of several μm. The second reception stage may manufacture a sample for analysis, for example, TEM analysis.

Accordingly, the second reception stage 233*b* may form a space in which a sample extracted from the unit wafer and the grid are coupled in the form of an attachable and detachable structure.

Furthermore, a fixture for fixing the grid 237 may be further installed in the second reception stage 233*b*. The fixture may have the same structure as the clamp unit 235. Accordingly, the grid 237 may have a structure that is fixed to the clamp unit 235 on both side surfaces of the grid 237.

The reception holder 230 may provide a loading space for loading the unit wafer S for analyzing the analysis target wafer W by using different analysis methods.

The sample conveying unit 300 may convey the analysis target wafer W, the unit wafer S, the reception holder on which the unit wafer S has been loaded, and the reception holder on which the sample AS for analysis has been loaded.

To this end, the sample conveying unit 300 may have a structure including first to third conveying modules 310, 320, and 330.

The first conveying module 310 may convey the analysis target wafer W to the sample processing unit 100. Referring to FIG. 2, the analysis target wafer W may be conveyed by a conveying container F, such as a front opening unified pod (FOUP). The first conveying module 310 may convey the analysis target wafer W, which is conveyed by the conveying container F, to the cutting apparatus of the sample processing unit 100. The analysis target wafer W is then subjected to cutting processing to form the unit wafer S.

Furthermore, the first conveying module 310 may also convey and receive the analysis target wafer W that has been subjected to cutting processing in the wafer station 212 of the sample storage unit 200, separate the unit wafers S, and remove residual material from the analysis target wafer W from the wafer station 212. Residue from the analysis target wafer W may be conveyed and stored in a separate storage space or discarded.

The first conveying module 310 may be implemented as a wafer conveying apparatus equipped with a robot arm.

The second conveying module 320 may convey and attach the unit wafer S to the reception holder 230. The second conveying module 320 may be implemented with a vacuum chuck for picking up the unit wafers S from the analysis target wafer W and separating the unit wafers S, an elevation member for moving the vacuum chuck up and down, and a conveying member for conveying the vacuum chuck to the sample storage unit 200, in which the reception holder 230 has been received. When the vacuum chuck of the second conveying module 320 fixes the unit wafer S using vacuum pressure, the elevation member may move the vacuum chuck up. The conveying member conveys the unit wafer S to the sample storage unit. Accordingly, the unit wafer S may be pressurized or attached to the grid 237 at the top of the reception holder 230. The second conveying module 320 may be implemented as a common die pick-up apparatus having various forms, which is used to bond a plurality of dies that has been formed by cutting a wafer. That is, the second conveying module 320 may be implemented by using a conveying apparatus having a structure capable of adsorbing the unit wafer S, moving the unit wafer S to the upper side of the second conveying module 320, conveying the unit wafer S in the state in which the unit wafer S has been picked up, moving the unit wafer S down in order to attach the unit wafer S to the first reception stage 233*a* or second reception stage 233*b* of the reception holder, and pressurizing the unit wafer S.

Furthermore, the second conveying module 320 may also be used in removing the sample AS for analysis from the reception holder 230" on which the sample AS for analysis has been loaded.

The second conveying module 320 may be implemented by using a chip conveying apparatus that is equipped with a common vacuum chuck having various forms. The second conveying module 320 may be used to separate a semiconductor chip from a wafer, and may be implemented by using a conveying apparatus having a structure that adsorbs the unit wafer S, moves the unit wafer S to the upper side of the structure, conveys the unit wafer S in the state in which the structure has picked up the unit wafer S, and moves down and pressurizes the unit wafer S in order to attach the unit wafer S to the first reception stage 233*a* or second reception stage 233*b* of the reception holder 230.

The third conveying module 330 may convey both the reception holder 230' to which the unit wafer S has been attached and the reception holder 230" to which the sample AS for analysis has been attached. The reception holder 230' and the reception holder 230" may be carried between the processing apparatus of the sample processing unit 100 and the sample storage unit 200. Furthermore, the third conveying module 330 may be used in carrying the reception holder 230", on which the sample AS for analysis is loaded, from the sample storage unit 200 to the sample analysis unit. The third conveying module 330 may also be used to carry the reception holder 230" on which the sample AS for analysis has been loaded from the sample analysis unit after an analysis process is performed.

The third conveying module 330 may be implemented by using a common article conveying apparatus that includes a robot arm and has various forms, which is used to convey articles.

Furthermore, after an analysis process is performed using the sample AS for analysis, the third conveying module 330 may carry the reception holder 230" on which the sample AS for analysis has been loaded out from the sample analysis unit. The third conveying module 330 may convey, to the first loading area 211, the reception holder 230".

Accordingly, the sample conveying unit 300 may be implemented by using an equipment front end module (EFEM), a wafer conveying apparatus, a die pick-up apparatus, or a conveyer belt that includes a robot arm, which is commonly used to convey a wafer. Multiple sample conveying units 300 may be installed in the system, and may form a structure that conveys a wafer, the unit wafer S, and the sample AS for analysis in each component. At least any one of a terminal module 520, a reading module 430, and a tag module 410 may be installed in each of the conveying modules 310, 320, and 330 of the sample conveying unit 300. Accordingly, the driving of the sample conveying unit 300 may be controlled by a controller 500 to be described later.

Referring to FIG. 1, the system for automating the processing of a sample for analysis according to an embodiment may include a sample classification unit 400.

The sample classification unit 400 may generate, store, and read an identification code that includes unique identification information of each of the analysis target wafer W, the unit wafer S, and the sample AS for analysis. The unit wafer S and the sample AS for analysis may be separated from each other and separately received and kept in the sample storage unit 200 based on identification codes of the unit wafer S and the sample AS for analysis. The sample classification unit 400 may generate and assign an identification code to a sample for analysis so that the sample for analysis can be identified. Accordingly, the system 10 for automating the processing of a sample for analysis according to an embodiment can automate processes of warehousing a wafer and manufacturing, receiving, and carrying out a sample for analysis.

To this end, the sample classification unit 400 may have a structure including the tag module 410, the reading module 430, and a code generation module 450.

The tag module 410 may be installed on one side of the reception holder 230, and may store identification codes of the reception holder 230, the unit wafer S, and the sample AS for analysis.

Furthermore, the tag module 410 may be installed in a wafer holder for conveying the analysis target wafer W, and may store an identification code of the analysis target wafer W.

The identification code may include at least one of a lot-ID, wafer-ID, shot-ID, or reception holder-ID of the analysis target wafer W, processing history information or analysis scheme information of the sample AS for analysis, as well as a unique identification information that includes a combination of the lot-ID, wafer-ID, shot-ID, or reception holder-ID of the analysis target wafer W and the processing history information or analysis scheme information of the sample AS for analysis.

In general, a method of manufacturing a semiconductor apparatus may include unit processes for each lot unit that includes 25 wafers. Accordingly, the lot-ID may mean identification information of a lot in which wafers are contained. The wafer-ID may be assigned when a wafer is input to a manufacturing line of a semiconductor apparatus, and may mean identification information that identifies which of the 1 to 25 slots in the lot has been used for mounting the analysis target wafer. The source of the analysis target wafer may be tracked and unique identification information of the analysis target wafer may be identified, by using the lot-ID and the wafer-ID. The shot-ID may indicate unique identification information, such as a separation location of a unit wafer that is manufactured by cutting a wafer. The reception holder-ID may include unique identification information of a holder and information indicating a location of a station within a holder or a location at which a unit wafer has been loaded. The processing history information may include information indicating a processing history as to which process has been used to process the sample for analysis. The analysis scheme information may include information identifying which analysis will be applied to the sample for analysis.

The tag module 410 may include a barcode, a radio frequency identification (RFID) tag, English letters, and number indicia. The tag module 410 is not necessarily implemented in a physical form. For example, the tag module 410 may be provided through only the form of software.

Specifically, the tag module 410 may include at least any one of an RFID tag, an IC chip, a barcode in which the identification information has been written, and a QR code in which the identification information has been written. In particular, the tag module 410 may be implemented by using an RFID tag or IC chip capable of near field communication (NFC).

The tag module 410 may store an identification code. An identification tag may store an identification code based on unique identification information of one or more of the unit wafer S and the sample AS for analysis to be identified.

The reading module 430 may recognize an identification code that is stored in the tag module 410, and may transmit the recognized identification code to the controller 500 and a management server unit 600. The reading module 430 may have a structure including at least one tag reader that is connected to a communication network in order to transmit an identification code.

The reading module 430 may be installed in each of the sample processing unit 100, the sample storage unit 200, and the sample conveying unit 300.

Specifically, the reading module 430 may be installed on one side of the processing apparatus that is provided in the sample processing unit 100, and may recognize an identification code of the tag module 410 that has been installed in the reception holder 230, and may transmit the recognized identification code to the controller 500 and the management server unit 600. Accordingly, when the reception holder 230 on which the unit wafer S has been loaded is conveyed to any one processing apparatus that is included in the sample processing unit 100, the reading module 430 may recognize an identification code of the tag module 410 that has been installed in the conveyed reception holder 230, and may transmit the recognized identification code.

Furthermore, the reading module 430 may be installed in the second conveying module 320 that is included in the sample conveying unit 300. Accordingly, the reading module 430 may recognize an identification code of the analysis target wafer W (such as a lot-ID, a wafer-ID, or a shot-ID) from the tag module 410. The identification code, which was installed in the analysis target wafer W in a process of separating the unit wafer S from a cut analysis target wafer W, may be transmitted by the reading module 430. The reading module 430 may recognize an identification code of the reception holder 230 in a process of loading the unit wafer S on the reception holder 230. As a result, the lot-ID, wafer-ID, or shot-ID of the analysis target wafer W and identification information for a separated location of the unit wafer S can be stored in the tag module 410 that has been installed in the reception holder 230. The management server unit 600 can generate inventory information indicating that the reception holder on which the unit wafer S has been loaded has been stored in the first reception area.

Furthermore, the reading module 430 may be additionally installed in the third conveying module 330 that is included in the sample conveying unit 300. Accordingly, if the second loading area 213 includes multiple divided reception spaces, the samples AS for analysis may be received in the reception spaces for each category based on processing information of the reception holder on which the sample AS for analysis has been loaded.

Furthermore, the reading module 430 may be installed in the sample storage unit 200. The reading module 430 that has been installed in the sample storage unit 200 may recognize an identification code of a tag module of the reception holder on which the unit wafer S that is carried out has been loaded. Furthermore, the reading module 430 may recognize an identification code of a tag module of the reception holder on which the sample AS for analysis that has been processed in each processing apparatus has been loaded. Accordingly, inventory information that is stored in the second reception area can be generated.

More specifically, the reading module 430 may be provided along with a processing apparatus or a terminal module of the sample conveying unit. The reception holder 230' on which the unit wafer S has been loaded may be conveyed to a specific processing apparatus based on processing information. When the unit wafer S is disposed in a corresponding processing apparatus, the reading module 430 may read identification information of the unit wafer S from the tag module 410.

In particular, the reading module 430 may continuously radiate a read signal to a conveying path of the sample conveying unit 300 along which the unit wafer S is conveyed. When the unit wafer S is disposed at the conveying path, the reading module 430 may detect that the unit wafer S has been disposed in a specific processing apparatus based on a reflected signal being received. Alternatively, if the tag module 410 that has been attached to the reception holder 230 is a transponder that actively transmits a signal, the reading module 430 may detect the tag module 410 by using a method of receiving a signal of the transponder that is disposed within a given distance.

Alternatively, the reading module 430 may be implemented by using a plurality of readers including automatic focus control means and a scan camera and a control program.

An identification code of the tag module 410 that is recognized through the reading module 430 may be transmitted to the management server unit 600 over at least any one of wired and wireless communication networks. In this specification, a communication method through a wired network and/or a wireless network may include all communication methods through which objects may be networked, and the present disclosure is not limited to wired communication, wireless communication, 3G, 4G, or other methods. Similarly, the above communication methods are not limited in communication between the terminal module and the reading module or another apparatus or communication between the system and the management server unit.

The management server unit 600 may store information, such as an analysis scheme, lot information, and a processing location. In particular, the lot information may include wafer map information or analysis location information.

The code generation module 450 may generate an identification code that includes different types of unique identification information, and may assign the generated identification code to the tag module 410 that has been installed in the reception holder so that the generated identification code is stored in the tag module 410. Since each of the unit wafer S and the sample AS for analysis can be identified based on such an identification code, the carrying-in and carrying-out of each of the unit wafer S and the sample AS for analysis that have been received in the sample storage unit 200 can be automatically controlled.

Specifically, when the reading module 430 that has been installed in a processing apparatus recognizes an identification code of the tag module 410 that has been installed in the reception holder 230 after the processing apparatus performs a processing process, the code generation module 450 may generate and transmit a new identification code to the corresponding tag module 410 in order to update processing information.

The code generation module 450 may generate a new identification code according to a processing process that is applied to the sample AS for analysis, which is manufactured by processing unit wafers S having different materials, manufacturing methods, or forms. The code generation module 450 may assign the new identification code to the tag module 410 so that each sample AS for analysis can be identified. Accordingly, processes of warehousing a plurality of analysis target wafers W and the manufacturing and carrying-in and carrying-out of the sample AS for analysis can be automatically performed.

More specifically, in a process of separating the unit wafer S and loading the unit wafer S on the reception holder 230 after the analysis target wafer W is warehoused and subjected to cutting processing, the reading module 430 that has been installed in the second conveying module 320 may recognize the tag module 410 that has been installed on one side of the analysis target wafer W and the tag module 410 that has been installed in the reception holder 230. Consequently, the code generation module 450 may recognize the lot-ID and wafer-ID of an analysis target wafer and the shot-ID of a unit wafer, may generate a first identification code, and may assign the first identification code to a tag module or unit of the reception holder.

Thereafter, the reception holder 230' on which the unit wafer S has been loaded may be carried out from the sample storage unit 200, may be conveyed to a corresponding processing apparatus based on analysis scheme information of the unit wafer S, which may be processed in the corresponding processing apparatus. The reading module 430 may be installed on one side of the processing apparatus, and may recognize the tag module 410 that has been attached to the reception holder. After a processing process is completed in the terminal module 520 of the processing apparatus and a completion signal is generated, the tag module 410 of the reception holder may be recognized by the reading module 430 of the processing apparatus, as the sample conveying unit 300 is carried out of the reception holder 230 from the processing apparatus. The code generation module 450 may determine that a unit wafer has been processed in the corresponding processing apparatus, may generate a second identification code, and may assign the second identification code to the tag module 410 of the reception holder 230 so that the second identification code is stored in the tag module 410. The generation of such a second identification code may be performed in each step of processing a unit wafer by using a processing apparatus so that information on all processing processes that have been performed is included in the second identification code. Accordingly, an identification code may include processing history information of a sample for analysis.

For example, the code generation module 450 may generate registration information indicative of a new record for each of pieces of processing of the analysis target wafer W, the unit wafer S, and the sample AS for analysis based on information of the analysis target wafer W, the unit wafer S, and the sample AS for analysis. In addition, the code generation module 450 may generate identification codes for each of the analysis target wafer W, the unit wafer S, and the sample AS for analysis by incorporating the registration information for each step, and may consecutively assign the identification codes to the analysis target wafer W, the unit wafer S, and the sample AS for analysis. Accordingly, the system 10 according to an embodiment can automatically control the carrying-in and carrying-out of the unit wafer S and the sample AS for analysis because the unit wafer S and the sample AS for analysis can be automatically identified based on respective identification codes.

Figure 5:
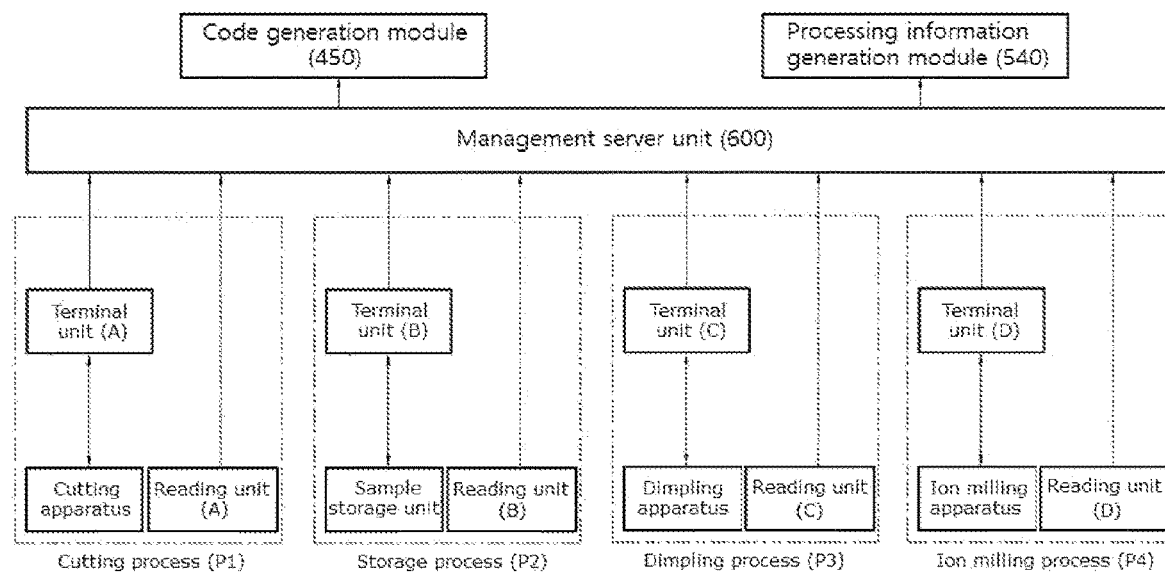
FIG. 5 is a block diagram illustrating a process of generating, by a code generation module, an identification code in a process of manufacturing a sample for SEM analysis by using a system for automating the processing of a sample for analysis according to an embodiment of the disclosure.

FIG. 5 is a block diagram illustrating a process of generating, by a code generation module, an identification code in a process of manufacturing a sample for SEM analysis by using a system for automating the processing of a sample for analysis according to an embodiment of the disclosure.

Referring to FIG. 5, in a cutting process P1, in order to manufacture a sample for SEM analysis, first, an analysis target wafer W may be conveyed to a cutting apparatus of a sample processing unit 100. A reading unit A of a reading module that has been installed on one side of the cutting apparatus may recognize an identification code of the analysis target wafer W by recognizing a tag module 410 that has been installed on one side of the analysis target wafer W, and may transmit the recognized identification code. The management server unit 600 may receive the identification code, and may control the cutting apparatus to perform cutting processing on the analysis target wafer W by transmitting a processing signal to a terminal unit A of a terminal module 520 that has been installed on one side of the cutting apparatus of the sample processing unit 100.

In a storage process P2, the analysis target wafer W that has been subjected to cutting processing may be conveyed and received in the sample processing unit 100. In this case, a reading unit B that has been installed in the sample processing unit 100 may recognize the identification code of the analysis target wafer W that has been subjected to cutting processing, and may transmit the recognized identification code to the management server unit 600.

Thereafter, the management server unit 600 may receive the identification code of the analysis target wafer W that has been subjected to cutting processing, may generate a driving signal, and may transmit the driving signal to a terminal unit B of the second conveying module 320. The second conveying module 320 may receive the driving signal, may separate a unit wafer S from the analysis target wafer W that has been subjected to cutting processing, and may load the separated unit wafer S on the reception holder 230'. The reading unit B of the second conveying module 320 may recognize an identification code of the reception holder 230', and may transmit the recognized identification code to the management server unit 600 and the code generation module 450.

In this case, the management server unit 600 may transmit analysis scheme information to a processing information generation module 540. The processing information generation module 540 may receive the analysis scheme information, may generate individual processing information, and may transmit the individual processing information to a terminal unit C of the dimpling apparatus of the sample processing unit 100, a terminal unit D of the ion cleaning apparatus, and a terminal unit of the third conveying module.

Thereafter, in a dimpling process P3, the terminal unit of the third conveying module 330 may receive the individual processing information, and may carry out, from the sample storage unit 200, the reception holder 230' on which a unit wafer corresponding to the individual processing information has been loaded. The reception holder 230' on which the unit wafer that has been carried out has been loaded may be conveyed to the dimpling apparatus. A first sample for analysis may be manufactured by performing dimpling processing on the unit wafer. The reading unit C of the dimpling apparatus may recognize an identification code of the reception holder 230' on which the unit wafer has been loaded, and may transmit the recognized identification code to the management server unit 600. The management server unit may store the received identification code, may generate a new identification code related to the dimpling processing through the code generation module 450, and may transmit the new identification code to the tag module 410 on which a corresponding sample for analysis has been loaded so that the new identification code is stored in the tag module 410. The identification code of the first sample for analysis may include a dimpling processing number, wheel specifications, etc.

Thereafter, in an ion milling process P4, the third conveying module 330 may carry out, from the dimpling apparatus, the reception holder 230" on which the first sample for analysis has been loaded, and may convey the reception holder 230" to an ion milling apparatus. The first sample for analysis may be subjected to ion milling processing and manufactured as a second sample for analysis. A reading unit D that has been installed on one side of the ion milling apparatus may transmit an identification code of the second sample for analysis. The management server unit 600 may receive and store the corresponding identification code. The code generation module 450 may generate a new identification code related to the ion milling processing through, and may transmit the new identification code to the tag module 410 on which the second sample for analysis has been loaded so that the new identification code is stored in the tag module 410. The unique identification information of the second sample for analysis may include information on whether ion milling processing has been performed, a processing number, etc.

The system for automating the processing of a sample for analysis according to an embodiment may include the controller 500.

The controller 500 may control the driving of the sample processing unit 100, the sample storage unit 200, the sample conveying unit 300, and the sample classification unit 400 based on an identification code. Accordingly, a processing process for a sample for analysis can be automated.

The controller 500 may have a structure including a communication module 510, the terminal module 520, a management module 530, and a processing information generation module 540.

The communication module 510 may receive an identification code that is recognized in the reading module 430, and may transmit the received identification code to the management module 530, the processing information generation module 540, and the management server unit 600. The communication module 510 may form a structure that transmits and receives an identification code, processing information, and analysis scheme information.

The communication module 510 may receive information that is read by the reading module 430 from the tag module 410 that has been attached to the reception holder 230' or 230", through communication with the terminal module 520 that is included in one or more process steps. In this case, an identification code that is read from the tag module 410 may include identification information of a unit wafer and a sample for analysis and information, such as a history or current state of a processing process that has already been performed on the unit wafer and the sample for analysis or the type or characteristic of a process that needs to be subsequently performed.

The terminal module 520 may be installed in a processing apparatus of the sample processing unit 100, and may play a role to receive individual processing information that is generated by the processing information generation module 540 and to individually control each processing apparatus to perform a processing process. When the processing process is completed in the processing apparatus, the terminal module 520 may generate a completion signal, and may transmit the completion signal to the code generation module 450. The code generation module 450 may be constructed to transmit a generated new identification code to the tag module 410 and the management server unit 600 so that the identification code is stored in the tag module 410 and the management server unit 600. The terminal module 520 may be provided in a plural number in a way to correspond to a plurality of process apparatuses.

The terminal module 520 may be installed on one side of the sample conveying unit 300, may receive processing information, and may control the driving of the sample conveying unit 300.

Specifically, when individual processing information is received from the processing information generation module 540, the terminal module 520 may convey, to a corresponding processing apparatus, the reception holder 230' on which a unit wafer corresponding to the individual processing information has been loaded based on the individual processing information.

Furthermore, when the processing of the unit wafer is completed based on the individual processing information, the terminal module 520 may convey, to the sample storage unit 200, the reception holder 230" on which a sample AS for analysis has been loaded, and may receive, in the second loading area 213, the reception holder 230" on which the sample AS for analysis has been loaded for each category based on the individual processing information.

Furthermore, the terminal module 520 may form a structure that receives a conveying signal from a sample analysis unit to be described later and that conveys, to the sample analysis unit, the reception holder 230" on which a corresponding sample for analysis has been loaded.

The management module 530 may collect and store management information for the quantity of the reception holder 230' on which the unit wafer has been loaded and the reception holder 230" on which the sample for analysis has been loaded, which are received in the sample storage unit 200. The management module 530 may be installed on one side of the sample storage unit 200.

Furthermore, the management module 530 may collect and store management information for the quantity of the reception holders 230", on which the sample for analysis has been loaded, by recognizing an identification code of the reception holder 230". An identification code of a reception holder 230" loaded with a carried-out sample for analysis is obtained from the reading module 430 installed in the sample storage unit 200.

The processing information generation module 540 may be involved in generating individual processing information for the unit wafer S based on the identification code and may transmit the generated individual processing information to the terminal module 520, the management module 530, and the sample conveying unit 300.

Accordingly, the processing order of the unit wafer S may be determined before the unit wafer S is processed in the sample processing unit 100. A sample AS for analysis can be manufactured by processing the unit wafer S by using at least one processing method based on individual processing information.

Specifically, when the management server unit receives an identification code from the reading module 430 and generates and transmits analysis scheme information, the processing information generation module 540 may receive the analysis scheme information and generate individual processing information.

The individual processing information may define the type of processing for a unit wafer, which will be performed in the future, or may define a characteristic related to a corresponding processing process, such as for example, a processing part, a processing quantity, a size, or a processing method.

The analysis scheme information may include information on an analysis method of the analysis target wafer W. The sample AS for analysis may be manufactured by processing the unit wafer S by using a different method based on analysis scheme information. Accordingly, the processing information generation module 540 may generate different processing information based on the analysis scheme information. That is, the analysis scheme information may include information on how the analysis target wafer W will be analyzed.

Furthermore, the processing information generation module 540 may be constructed to generate individual processing information by adjusting at least any one of a processing process, processing form, processing location, and processing quantity of a unit wafer based on the analysis scheme information and information on the quantity of the unit wafers S that is collected by the management module 530. Furthermore, a processing apparatus of the sample processing unit 100 may adjust a processing location and a processing form. Furthermore, the sample conveying unit 300 may convey the unit wafer to the sample processing unit 100 based on a processing quantity.

To this end, the communication module 510 may transmit, to the terminal module 520, the individual processing information that is generated by the processing information generation module 540. A processing apparatus in which a corresponding terminal module 520 has been installed may be constructed to process a corresponding unit wafer S.

Furthermore, the individual processing information may be transmitted to the terminal module 520 of the sample conveying unit 300. Accordingly, the reception holder 230' on which the corresponding unit wafer S has been loaded may be conveyed to a processing apparatus on which the terminal module 520 has been installed.

Moreover, the individual processing information may be transmitted to the terminal module 520 that has been installed in the sample storage unit 200 so that whether the corresponding unit wafer S is carried out may be determined and inventory information may be changed.

Furthermore, the communication module 510 may transmit, to the terminal module 520, individual processing information that is generated by the processing information generation module 540 again. The terminal module 520 may output a processing signal so that a corresponding processing apparatus in a corresponding process step may perform a processing process. In this case, the individual processing information may be transmitted to one or a plurality of apparatuses that are used in a process step and may correspond to the terminal module 520 that has transmitted information read from the tag module 410.

The controller 500 may include a check module 550. The check module 550 may be installed on one side of a processing apparatus of the sample processing unit 100. The check module 550 may identify a state of the sample processing unit 100. When the state of the sample processing unit 100 is identified as a driving state, a regular check state, or a failure state, the check module 550 may generate and transmit a waiting signal to the sample conveying unit 300, which is controlled to maintain a command waiting state based on a preset time value without performing a conveying process.

The check module 550 may be implemented using a vibration sensor, a weight detection sensor, or a combination of the vibration sensor and the weight detection sensor, and may be implemented by introducing various sensors in addition to the sensors.

The controller 500 may include an input module 560. The input module 560 is a component that enables a user to input analysis scheme information or a manager to input various types of update information for control of the system 10. When a user inputs control information, the input module 560 may transmit the control information to the management server unit 600 for system control. The management server unit 600 may store the analysis scheme information and the control information, and may control the driving of the system.

For example, when a user indicates the manufacturing of a large area sample for SEM analysis through the input module 560, the controller 500 may control an operation of each component so that the sample for SEM analysis is manufactured and the manufactured sample for SEM analysis is stored. The input module 560 may be implemented by using a keypad, a dome switch, a touchpad, a jog wheel, or a jog switch.

The system 10 for automating the processing of a sample for analysis according to an embodiment may include the controller 500 having the components described above, and may integrate and manage processes for manufacturing and carrying in and out a unit wafer and a sample for analysis.

The system 10 for automating the processing of a sample for analysis according to an embodiment may include the management server unit 600. The management server unit 600 may store and transmit an identification code, individual processing information, analysis scheme information, and a value input by a user, and may integrate and manage various types of information. The management server unit 600 may be implemented as an analysis request computation system. The analysis request computation system may have a plurality of S/Ns. Such information may include analysis scheme information, and may include information, such as lot information or analysis-required location of an analysis target wafer, which is associated with FAB. Furthermore, the management server unit 600 may apply to or skip a processing procedure, and may carry out, convey, process, and analyze an analysis target wafer in a wafer storage area, based on the information.

The system 10 for automating the processing of a sample for analysis according to an embodiment may further include a processing inspection unit.

The processing inspection unit may be installed between the sample processing unit 100 and the sample storage unit 200, and may identify processing location coordinates and whether a defect has occurred in a sample AS for analysis being conveyed by the sample conveying unit 300. The defect may include contamination, a scratch, chipping, or a crack.

If a defect is detected in a sample AS for analysis, the processing inspection unit may cause the sample AS for analysis to be discarded before receiving the sample AS for analysis in the sample storage unit 200. The processing inspection unit may be implemented by using an optical microscope or an analysis apparatus.

The components of the system 10 for automating the processing of a sample for analysis according to an embodiment may include structures that transmit and receive various types of information and that are controlled by being connected over a communication network in a wired or wireless communication manner.

Furthermore, the system for automating the processing of a sample for analysis according to an embodiment may further include a manager terminal unit that receives a driving state and task information of the sample processing unit, the sample storage unit, and the sample conveying unit.

The manager terminal unit may monitor the system 10 in real time by receiving state information of each of the processing apparatuses of the sample processing unit 100 and task information of a processing process that is performed in the processing apparatus, and may enable a manager to immediately take measures by inputting a control command to the controller 500 when an error occurs so that the driving of the sample processing unit 100 can be controlled.

The system for automating the processing of a sample for analysis according to an embodiment can realize various services through a wireless or wired communication connection between multiple processing apparatuses, the manager terminal unit (or a client), and the management server unit. The manager terminal unit may be a personal computer (PC) including a desktop computer, a tablet computer, or a laptop computer, and may be a personal communication device that guarantees mobility, such as a smart device including a personal digital assistant (PDA), a cellular phone, or a smartphone. A data generation unit that generates state information and task information may be installed in each processing apparatus. The processing apparatus may include a plurality of sensors for the data generation unit. Accordingly, a measured value that is detected by the sensor may be provided to the data generation unit. The data generation unit may generate state information and task information of the processing apparatus, may transmit the state information and the task information to the management server unit. The management server unit may transmit the state information and the task information to the manager terminal unit so that a manager can identify the state of the processing apparatus in real time.

A measured value that is detected by the sensor may include an operating state or abrasion state of each of parts that constitute the processing apparatus, a step that is executed in a processing process, and a defective state and progress state of a processing process.

An individual identification code may be assigned to the processing apparatus. The data generation unit may transmit state information and task information that are generated based on a measured value of the sensor along with an apparatus identification code so that a manager can check a defect occurring in a processing apparatus included in the sample processing unit, check the progress state is, or check which processing process is performed, through the manager terminal unit.

The system 10 for automating the processing of a sample for analysis according to an embodiment can rapidly provide the results of analysis through unmanned automation of a wafer processing process, can enhance analysis technology competitiveness, and can reduce input manpower, costs, and time consumption for sample processing.

Figure 6:
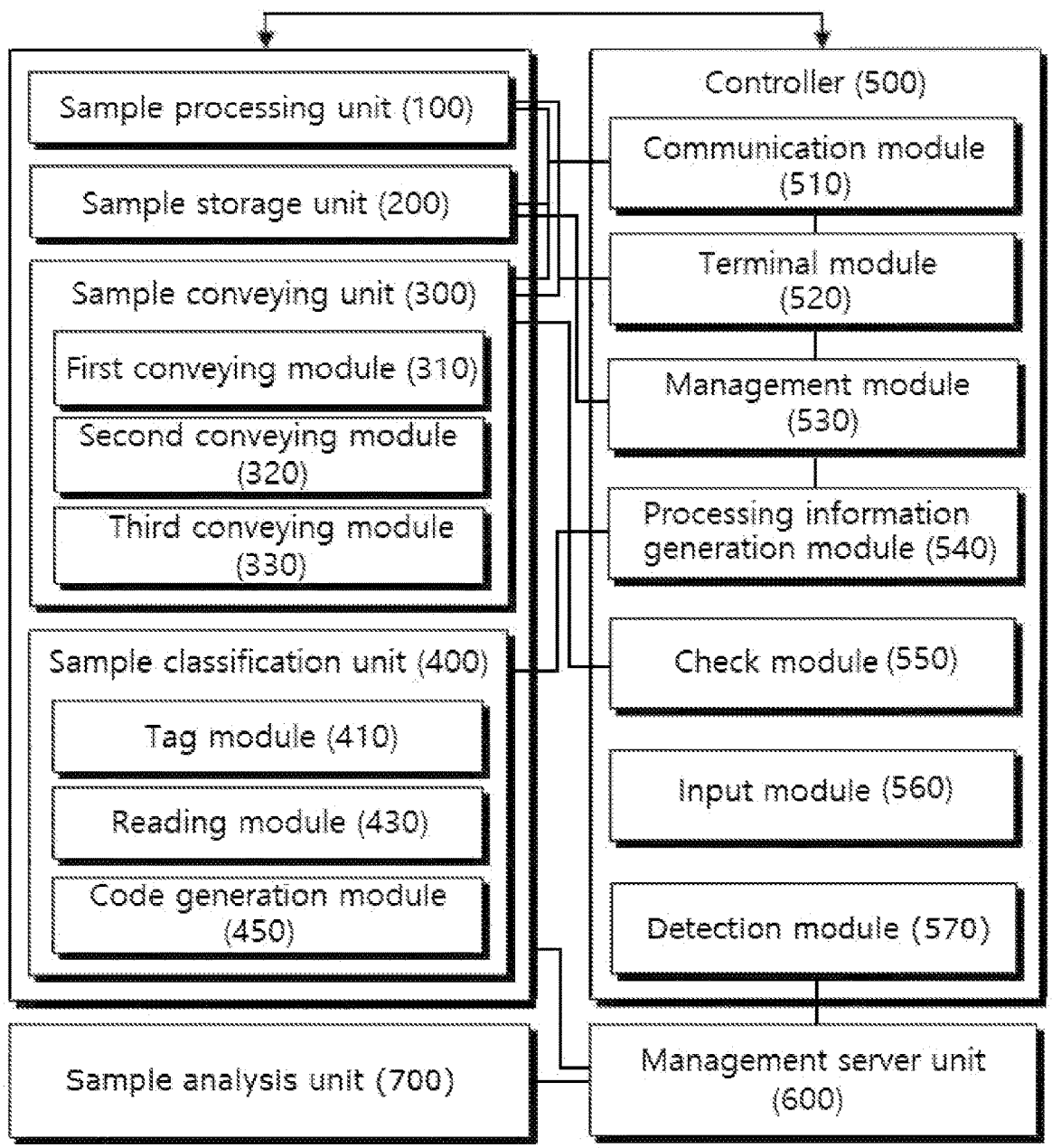
FIG. 6 is a construction diagram illustrating a wafer analysis automation system according to an embodiment of the disclosure.

FIG. 6 is a construction diagram illustrating a wafer analysis automation system according to an embodiment of the disclosure.

Referring to FIG. 6, a wafer analysis automation system 20 according to an embodiment of the disclosure may have a sample processing unit 100, a sample storage unit 200, a sample conveying unit 300, and a sample analysis unit 700.

The sample processing unit 100, the sample storage unit 200, and the sample conveying unit 300 are substantially the same as those of units in a system 10 for automating the processing of a sample for analysis. Detailed descriptions of the sample processing unit 100, the sample storage unit 200, and the sample conveying unit 300 are therefore omitted below.

A first loading area 211 of the sample storage unit 200 may provide a space for a reception holder 230" loaded with a sample AS for analysis to be carried out from the sample analysis unit, after the reception holder 230" is analyzed by using an analysis scheme. The first loading area 211 may also provide a space in which the sample AS for analysis is removed from the reception holder 230" after the sample AS for analysis is analyzed. Accordingly, the reception holder 230 on which the unit wafer S or the sample AS for analysis has not been loaded may be kept in the first loading area 211.

Furthermore, the second conveying module 320 of the sample conveying unit 300 may separate the sample AS for analysis from the clamp unit 235 by pressurizing the sample AS for analysis or may remove the sample AS for analysis from the grid 237 by separating the sample AS for analysis.

The second conveying module 320 may have a structure in which the reading module 430 and the terminal module 520 have been installed. Accordingly, an identification code of the tag module 410 that has been installed in the reception holder 230 may be recognized. The code generation module may be constructed to generate and transmit a new identification code to the tag module 410 corresponding to the identification code, so that the reception holder 230 on which a unit wafer and a sample for analysis have not been loaded can be reused.

The sample analysis unit 700 may include at least one analysis apparatus, and may analyze the sample AS that is carried out from the sample storage unit 200, based on analysis scheme information.

The sample analysis unit 700 may include various common analysis apparatuses which are used for wafer analysis.

For example, the sample analysis unit 700 may analyze a sample for analysis by using at least one method among electron microscope analysis using a scanning electron microscope (SEM) and/or a transmission electron microscope (TEM), focused ion beam (FIB) analysis, secondary ion mass spectrometry (SIMS), atomic force microscopy (AFM) analysis, scanning probe microscopy (SPM) analysis, secondary ion mass spectrometry (SIMS), X-ray photoelectron spectroscopy (XPS), ion scattering spectroscopy (ISS), photo electron emission microscopy (PEEM) analysis, Auger electron spectroscopy, low energy electron diffraction (LEED) analysis, reflection high energy diffraction (RHEED) analysis, and electron energy loss spectroscopy (EELS).

The sample analysis unit 700 may check a defect in an analysis target wafer by analyzing a sample AS for analysis so that a method of manufacturing a wafer can be improved.

The sample conveying unit 300 may be included in the reading module 430. The sample conveying unit 300 may identify a sample AS for analysis based on an identification tag of the tag module 410, may convey the sample AS for analysis to a specific apparatus of the sample analysis unit 700, and may also convey the sample AS for analysis between apparatuses that constitute the sample analysis unit 700. Accordingly, all processes for wafer analysis can be automated.

Furthermore, the controller 500 may further include a detection module 570 that identifies a state of the sample analysis unit 700. When the state of the sample analysis unit 700 is identified as a driving state, a regular check state, or a failure state, the detection module 570 may generate a waiting signal so that the sample conveying unit 300 maintains a waiting state based on a preset time value, and may control the process by stopping the supply of a sample AS for analysis to the sample analysis unit 700.

The wafer analysis automation system 20 according to an embodiment may include a sample classification unit 400, a controller 500, a management server unit 600, a processing inspection unit, and a power supply unit.

Figure 7:
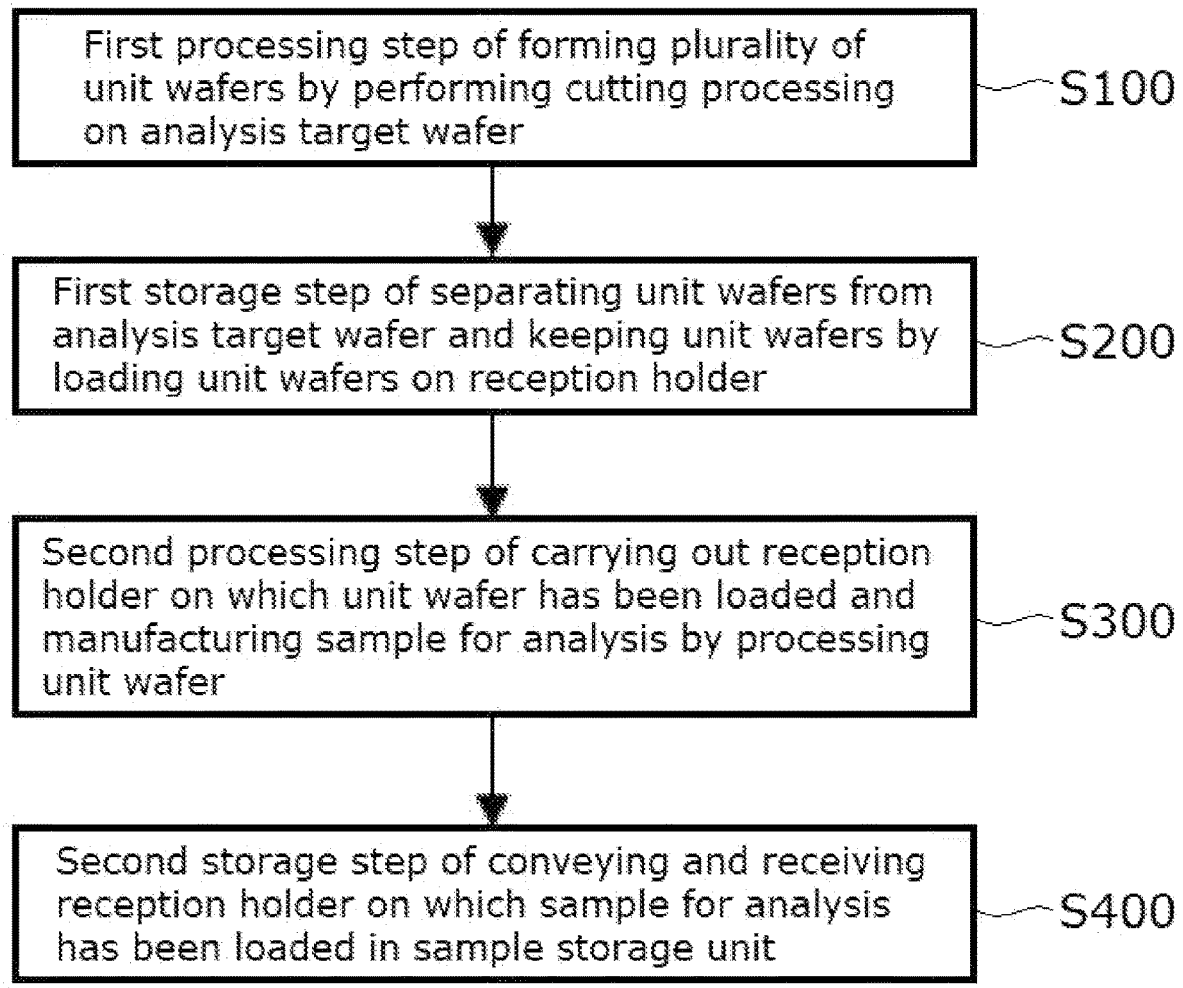
FIG. 7 is a process chart illustrating a method of processing a sample for analysis according to an embodiment of the disclosure.

FIG. 7 is a process chart illustrating a method of processing a sample for analysis according to an embodiment of the disclosure.

Referring to FIG. 7, a method of processing a sample for analysis according to an embodiment may include a first processing step S100, a first storage step S200, a second processing step S300, and a second storage step S400.

The first processing step S100 may be a step of conveying an analysis target wafer W to a sample processing unit 100 and forming a plurality of unit wafers S by performing cutting processing on the analysis target wafer W.

Specifically, in this step, the analysis target wafer W may be conveyed to a conveying container, such as a FOUP. The analysis target wafer W may be conveyed to a sample processing unit 100 through a sample conveying unit 300. The sample processing unit 100 may manufacture a plurality of unit wafers S by performing cutting processing on the analysis target wafer W.

The first storage step S200 may be a step of separating the unit wafers S from the analysis target wafer W and keeping the unit wafers S by loading the unit wafers S onto the reception holders 230, which are received by the sample storage unit 200.

Specifically, the unit wafer S may be separated from the analysis target wafer W through the sample conveying unit 300, and may be conveyed to a first loading area 211 in which a reception holder 230 has been received. When the unit wafer S has been disposed on the first reception stage 233a or second reception stage 233b of the reception holder 230, the unit wafer S may be lowered down and removably affixed to the first reception stage 233a or the second reception stage 233b. In this case, the unit wafer S may be loaded on the reception holder 230 by using a method of fixing the unit wafer S by pressing the clamp unit 235 that has been formed in the first reception stage 233a or by fixing the unit wafer S to the grid 237, which has in turn been fixed to the top of the second reception stage 233b. The reception holder 230' on which the unit wafer has been loaded may be stored in the first loading area 211.

Furthermore, the first storage step S200 may further include a step of storing the reception holder on which the unit wafer has been loaded and determining, by the check module 550, whether the unit wafer S may be processed in the sample processing unit 100, when a carry-out signal of a corresponding unit wafer is generated based on individual processing information.

The check module 550 may identify a state of the sample processing unit 100, and may perform control by generating a waiting signal when the state of the sample processing unit 100 is a driving state, a regular check state, or a failure state and transmitting the waiting signal to the sample conveying unit 300 so that the sample conveying unit 300 maintains a command waiting state based on a preset time value, without performing a conveying process. Thereafter, the check module 550 may determine and select to which analysis apparatus of the sample analysis unit 700 a sample for analysis will be carried out based on an identification code.

The second processing step S300 may be a step of carrying out a reception holder 230' on which the unit wafer S has been loaded from the sample storage unit 200, conveying the reception holder 230' to the sample processing unit 100, and manufacturing a sample AS for analysis by processing the unit wafer S.

In this step, the sample conveying unit 300 may receive individual processing information that is generated by the processing information generation module 540, may carry out the reception holder 230' on which a unit wafer S corresponding to the individual processing information has been loaded from the sample storage unit 200, and may convey the reception holder 230' on which the corresponding unit wafer has been loaded to a processing apparatus corresponding to the individual processing information.

Furthermore, the terminal module 520 of the sample processing unit may recognize the individual processing information that has been generated by the processing information generation module 540, and may process the reception holder 230' on which the corresponding unit wafer has been loaded. In this step, the sample AS for analysis may be manufactured by processing the unit wafer S by using at least one processing method. The unit wafer S may be processed based on the individual processing information that has been generated by the processing information generation module 540.

The second storage step S400 may be a step of conveying and receiving the reception holder 230" on which the sample AS for analysis has been loaded in the second loading area 213 of the sample storage unit.

In this step, the reception holder 230", on which the sample for analysis on which the processing has been completed has been loaded, may be received. The tag module 410 that has been installed in the reception holder may recognize an identification code of the sample for analysis. The identification code may be stored in the management module 530.

A sample AS for analysis may be manufactured through the automation method. When a carry-out signal for analysis is received by the sample conveying unit 300 and the management module 530, the sample conveying unit 300 may convey the reception holder 230" on which the manufactured sample AS for analysis has been loaded to the sample analysis unit 700. The sample analysis unit 700 may perform analysis on the sample AS.

Figure 8:
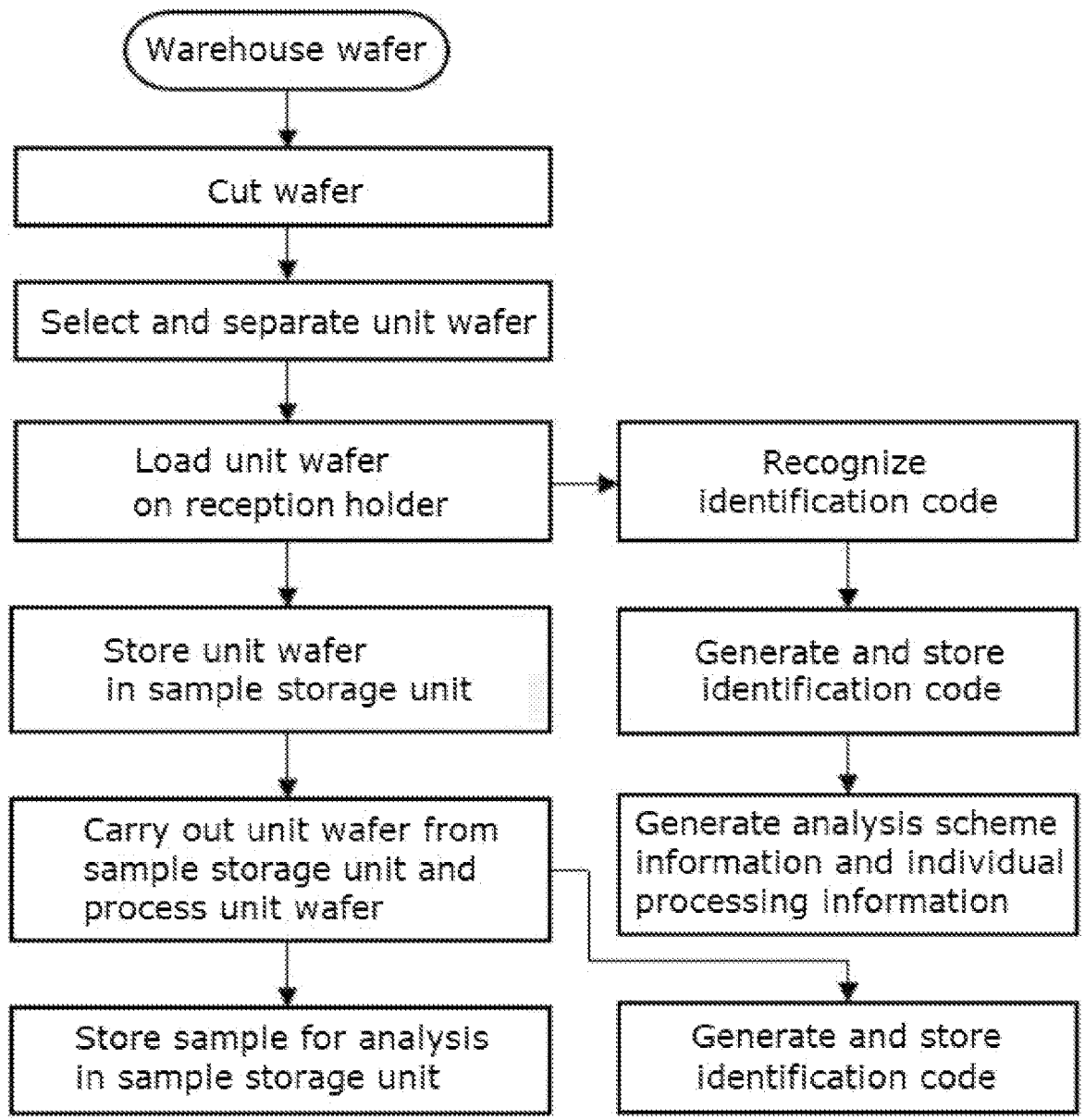
FIG. 8 is a flowchart illustrating a detailed process of a processing step in a method of processing a sample for analysis according to an embodiment of the disclosure.

FIG. 8 is a flowchart illustrating a detailed process of a processing step in a method of processing a sample for analysis according to an embodiment of the disclosure.

A method of processing a unit wafer according to an embodiment is more specifically described with reference to FIG. 8. First, an analysis target wafer W may be warehoused through a wafer conveying container, such as a FOUP. The warehoused analysis target wafer W may be conveyed to a sample processing unit 100. The sample processing unit 100 may perform cutting processing on the analysis target wafer W.

Thereafter, the analysis target wafer W on which the cutting processing has been performed may be received in a wafer station 212 of the sample storage unit. In the wafer station 212, a unit wafer S may be selected and separated from the analysis target wafer W on which the cutting processing has been performed. A separated unit wafer S may be loaded on a reception holder 230'. Accordingly, the unit wafer S may be stored in a sample storage unit 200.

Thereafter, the reception holder 230' on which the unit wafer S has been loaded, may be carried out from storage in the sample storage unit 200. The sample processing unit 100 may manufacture a sample AS for analysis by processing the unit wafer S. The state of the manufactured sample AS for analysis is the state in which the manufactured sample AS for analysis has been loaded on a reception holder 230". As described above, the reception holder 230" on which the sample AS for analysis has been loaded may be conveyed to the sample storage unit 200 and received and stored in the sample storage unit 200.

As described above, in the step of separating the unit wafer S from the analysis target wafer W, a tag module that has been installed on one side of the analysis target wafer W may recognize an identification code of the analysis target wafer W. The recognition of the identification code may be performed by a second conveying module 320. The second conveying module 320 may convey and load the separated unit wafer S onto the reception holder 230. In such a process, the identification code may be recognized from the tag module 410 that has been installed in the reception holder 230, and may be transmitted. A reading module 430 may transmit the recognized identification code to a processing information generation module 540 and the management server unit 600.

Thereafter, a new identification code may be generated based on the identification code of the analysis target wafer W and an identification code of the reception holder 230, and may be transmitted and stored in the tag module 410 of the reception holder.

The identification code of the analysis target wafer W may include a lot-ID, wafer-ID, and shot-ID of the analysis target wafer. The identification code of the reception holder 230 may include a unique identification information of the reception holder, and identification information indicating locations of a first reception stage 233a and a second reception stage 233b in the reception holder 230.

Accordingly, a new identification code may be generated based on the identification code of the analysis target wafer W and the identification code of the reception holder 230, and may be stored in the tag module 410 of a reception holder 230' on which the unit wafer S has been loaded. That is, the new identification code may mean the identification code of the unit wafer S that includes both the identification code of the analysis target wafer W and the identification code of the reception holder 230.

Thereafter, a management server unit 600 may recognize the identification code of the analysis target wafer W, may generate analysis scheme information based on the recognized identification code, and may transmit the generated analysis scheme information to the processing information generation module 540. The processing information generation module 540 may generate individual processing information based on the analysis scheme information, and may transmit the generated individual processing information.

Furthermore, the analysis target wafer W on which cutting processing has been performed may be received in a wafer station 212 of the sample storage unit. A unit wafer S, which has been received in the wafer station 212, may be selected and separated from the analysis target wafer W on which cutting processing has been performed. The separated unit wafer S may be loaded on the reception holder 230.

When the process of processing the unit wafer is completed, a terminal module 520 may generate a completion signal and transmit the completion signal to a code generation module 450. The code generation module 450 may generate a new identification code including processing information, may store the new identification code in the tag module 410 of the reception holder 230' on which the unit wafer has been loaded. A sample AS for analysis may be manufactured by performing such a process at least once.

More specifically, the second processing step S300 may be performed by being subdivided into the following steps.

First, a processing process of a unit wafer for processing may be selected by identifying analysis scheme information in an identification code that has been recognized from a tag module of the reception holder 230' on which a unit wafer has been loaded. The unit wafer may be conveyed to a processing apparatus that is indicated in analysis scheme information. The processing process may be performed on the unit wafer. For example, in order to manufacture a large area sample for SEM analysis, a first sample for analysis may be manufactured by performing dimpling processing on a unit wafer for processing. Identification information of the first sample for analysis may be stored. The identification information of the first sample for analysis may include a dimpling processing number and wheel specifications.

Thereafter, after the first sample for analysis is conveyed to the ion cleaning apparatus, a second sample for analysis may be manufactured by performing ion cleaning processing on the first sample for analysis. Thereafter, identification information of the second sample for analysis may be stored. The unique identification information of the second sample for analysis may include whether ion cleaning processing has been performed and a processing number. An identification code of the second sample for analysis may be generated based on the unique identification information, may be stored, and may be assigned to the second sample for analysis.

The system for automating the processing of a sample for analysis according to an embodiment and the method of processing a sample for analysis can rapidly provide the results of analysis, enhance analysis technology competitiveness, and reduce input manpower, costs, and time for sample processing by automating all processes including processes for the warehousing of a wafer, sample processing, and a distribution of a sample for each analysis based on an identification code.

Furthermore, although a manufacturer uses different processing equipment, an automated system can be implemented by using a method of adjusting the processing equipment according to the standards of the reception holder by introducing a reception holder that has been standardized to process a sample for analysis.

Accordingly, the system for automating the processing of a sample for analysis may be used for processing a sample for analysis for wafer analysis in the semiconductor, solar, and display industries.

The detailed description of the preferred embodiments of the present disclosure disclosed as described above have been provided so that those skilled in the art can implement and practice the present disclosure. Although the present disclosure has been described with reference to the preferred embodiments, those skilled in the art may understand that the present disclosure may be modified and changed in various manners without departing from the scope of the present disclosure. For example, those skilled in the art may use each of the elements described in the embodiments in such a way as to combine the elements. Accordingly, the present disclosure is not intended to be limited to the embodiments, but is intended to assign the widest range complying with the disclosed principles and new characteristics.

What is claimed is:

1. A system for automating processing of a sample for analysis, the system comprising:
    a sample processing unit configured to manufacture a plurality of unit wafers by cutting an analysis target wafer and to manufacture a sample for analysis by applying at least one process to one of the plurality of unit wafers;
    a sample storage unit including a loading area having a plurality of reception holders, on which a unit wafer and the sample for analysis have been loaded, that are carried in and out; and
    a sample conveying unit configured to convey the analysis target wafer, the unit wafer, and the sample for analysis respectively between the sample processing unit and the sample storage unit,
    wherein a reception holder comprises:
    a holder body;
    a first reception stage formed on one side of and at a top of the holder body and to which the unit wafer is removably coupled,
    wherein the first reception stage comprises a clamp unit,
    wherein the clamp unit comprises:
    a fixing groove inserted on the one side of the holder body and on an upper side of the holder body;
    a support plate installed within the fixing groove and configured to have the unit wafer seated at a top of the support plate and a shaft formed at a bottom of the support plate;
    an elastic member installed along an outer circumference surface of the shaft; and
    an elastic clip equipped with a trapping protrusion that protrudes from an inner wall of the fixing groove,
    wherein the clamp unit removably fixes the unit wafer to an upper side when the unit wafer is pressed.

2. The system of claim 1, wherein the sample processing unit uses at least one processing apparatus from among a cutting apparatus, a dimpling apparatus, an ion milling apparatus, a polishing apparatus, a coating apparatus, a grinding apparatus, a cleaning apparatus, and a punching apparatus to process the one of the plurality of unit wafers.

3. The system of claim 1, wherein the reception holder comprises
    a second reception stage formed on another side of and at the top of the holder body and to which a grid with the unit wafer is removably coupled.

4. The system of claim 1, wherein the clamp unit comprises a cover frame inserted and coupled to the fixing groove,
    wherein the cover frame forms a space in which the elastic clip moves, and may have a structure in which an exposure hole has been formed so that the trapping protrusion is exposed on one side of and the top of the cover frame.

5. The system of claim 1, wherein the sample storage unit comprises:
    a first loading area, in which the reception holder is stored, in which the unit wafer is coupled to at least any one of a first reception stage and second reception stage of the reception holder; and
    a second loading area from which the sample for analysis is carried in and out.

6. The system of claim 1, wherein the sample conveying unit comprises:
a first conveying module configured to convey the analysis target wafer to the sample processing unit;
a second conveying module configured to convey and attach the unit wafer to the reception holder; and
a third conveying module configured to convey the reception holder to the sample processing unit.

7. The system of claim 1, further comprising a sample classification unit comprising:
a tag module installed on one side of the reception holder to store identification codes of the unit wafer and the reception holder;
a reading module configured to recognize the identification codes that have been stored in the tag module; and
a code generation module configured to generate an identification code and to transmit the generated identification code to the tag module.

8. The system of claim 7, wherein the identification code comprises at least any one of a lot-ID, wafer-ID, shot-ID, and reception holder-ID of the unit wafer, and comprises processing history information and analysis scheme information of the sample for analysis.

9. The system of claim 7, wherein the tag module comprises at least any one of an electronic tag (RFID), an IC chip, a barcode in which identification information has been written, and a QR code in which the identification information has been written.

10. The system of claim 7, further comprising a controller comprising:
a communication module configured to transmit and receive identification codes that are recognized by the reading module;
a terminal module installed in the sample processing unit and configured to receive individual processing information and to control performance of a processing process;
a management module configured to store identification codes of the unit wafer and of the sample for analysis, which has been received in the sample storage unit, and configured to manage carrying-in and carrying-out of the unit wafer and the sample for analysis that have been received in the sample storage unit; and
a processing information generation module configured to generate individual processing information of the unit wafer based on the identification code and configured to transmit the generated individual processing information to the terminal module, the management module, and the sample conveying unit,
wherein the controller is configured to control operations of the sample processing unit, the sample storage unit, and the sample conveying unit based on the identification code.

11. The system of claim 10, wherein the processing information generation module is configured to generate the processing information by receiving analysis scheme information of the unit wafer when a management server generates the analysis scheme information based on the identification code and transmits the generated analysis scheme information.

12. The system of claim 11, wherein the processing information generation module is configured to generate the individual processing information by adjusting at least any one of a processing state, processing location, and processing quantity of the unit wafer, based on the analysis scheme information and quantity information of the unit wafer that has been collected by the management module.

13. The system of claim 10, wherein the controller comprises a check module configured to identify a state of the sample processing unit and to maintain a command waiting state in the sample conveying unit based on a preset time value by generating a waiting signal when the state of the sample processing unit is identified as a driving state, a regular check state, or a failure state.

14. The system of claim 1, further comprising a manager terminal unit configured to receive driving state and task information of the sample processing unit, the sample storage unit, and the sample conveying unit.

15. A wafer analysis automation system comprising:
a sample processing unit configured to manufacture a plurality of unit wafers by cutting an analysis target wafer and configured to manufacture a sample for analysis by subjecting a unit wafer to at least one processing process;
a sample storage unit, including a loading area with reception holders on which the unit wafer and the sample for analysis have been loaded, to and from which the reception holders are carried;
a sample analysis unit configured to analyze the sample for analysis from the sample storage unit; and
a sample conveying unit configured to convey, respectively, the analysis target wafer, the unit wafer, and the sample for analysis between the sample processing unit and the sample storage unit,
wherein a reception holder comprises:
a holder body; and
a first reception stage formed on one side of and at a top of the holder body and to which the unit wafer is removably coupled,
wherein the first reception stage comprises a clamp unit,
wherein the clamp unit comprises:
a fixing groove inserted on the one side of the holder body and on an upper side of the holder body;
a support plate installed within the fixing groove and configured to have the unit wafer seated at a top of the support plate and a shaft formed at a bottom of the support plate;
an elastic member installed along an outer circumference surface of the shaft; and
an elastic clip equipped with a trapping protrusion that protrudes from an inner wall of the fixing groove,
wherein the clamp unit removably fixes the unit wafer to an upper side when the unit wafer is pressed.

16. The wafer analysis automation system of claim 15, further comprising a detection module configured to generate a waiting signal when a state of the sample analysis unit is identified as a driving state, a regular check state, or a failure state, and configured to identify a state of the sample analysis unit so that the sample conveying unit maintains a waiting state based on a preset time value and stops conveyance of the sample for analysis to the sample analysis unit.

17. The wafer analysis automation system of claim 15, wherein the sample analysis unit is configured to analyze the sample for analysis by using one or more methods selected from a group comprising electron microscope analysis, focused ion beam (FIB) analysis, secondary ion mass spectrometry (SIMS), atomic force microscopy (AFM) analysis, scanning probe microscopy (SPM) analysis, secondary ion mass spectrometry (SIMS), X-ray photoelectron spectroscopy (XPS), ion scattering spectroscopy (ISS), Auger electron spectroscopy, low energy electron diffraction (LEED) analysis, photo electron emission microscopy (PEEM)

analysis, reflection high energy diffraction (RHEED) analysis, and electron energy loss spectroscopy (EELS).

18. A method of processing a sample for analysis, the method comprising:
- a first processing step of conveying an analysis target wafer to a sample processing unit and forming a plurality of unit wafers by performing cutting processing on the analysis target wafer;
- a first storage step of separating a unit wafer from the analysis target wafer and storing the unit wafer loaded on a reception holder that has been received in a sample storage unit;
- a second processing step of carrying out, from the sample storage unit, the reception holder loaded with the unit wafer, conveying the reception holder to the sample processing unit, and manufacturing a sample for analysis by processing the unit wafer using individual processing information based on an identification code; and
- a second storage step of conveying the sample for analysis loaded on the reception holder to be received by the sample storage unit,
- wherein the reception holder comprises:
- a holder body; and
- a first reception stage formed on one side of and at a top of the holder body and to which the unit wafer is removably coupled,
- wherein the first reception stage comprises a clamp unit,
- wherein the clamp unit comprises:
- a fixing groove inserted on the one side of the holder body and on an upper side of the holder body;
- a support plate installed within the fixing groove and configured to have the unit wafer seated at a top of the support plate and a shaft formed at a bottom of the support plate;
- an elastic member installed along an outer circumference surface of the shaft; and
- an elastic clip equipped with a trapping protrusion that protrudes from an inner wall of the fixing groove,
- wherein the clamp unit removably fixes the unit wafer to an upper side when the unit wafer is pressed.

19. The method of claim 18, wherein the first storage step includes
- recognizing identification codes of the analysis target wafer, the unit wafer, and the reception holder when separating the unit wafer from the analysis target wafer and loading the separated unit wafer into the reception holder,
- generating a new identification code and analysis scheme information based on the identification codes,
- generating individual processing information of the unit wafer based on the analysis scheme information, and
- transmitting the generated individual processing information of the unit wafer to the sample processing unit and the sample storage unit.

20. The method of claim 19, wherein the second processing step includes
- carrying out, by a sample conveying unit that receives the individual processing information, a unit wafer corresponding to the new identification code from the sample storage unit,
- conveying the unit wafer to the sample processing unit,
- receiving, by the sample processing unit, the individual processing information, and
- manufacturing a sample for analysis by processing the unit wafer.

* * * * *